United States Patent
Li

(10) Patent No.: US 10,820,281 B2
(45) Date of Patent: Oct. 27, 2020

(54) METHOD AND TERMINAL FOR CONTROLLING TRANSMISSION POWER

(71) Applicant: XI'AN YEP TELECOMMUNICATION TECHNOLOGY., LTD, Xi'an, Shaanxi (CN)

(72) Inventor: Wei Li, Shaanxi (CN)

(73) Assignee: XI'AN YEP TELECOMMUNICATION TECHNOLOGY., LTD, Xi'an (CN)

( * ) Notice: Subject to any disclaimer, the term of this patent is extended or adjusted under 35 U.S.C. 154(b) by 0 days.

(21) Appl. No.: 16/429,256

(22) Filed: Jun. 3, 2019

(65) Prior Publication Data

US 2019/0289557 A1    Sep. 19, 2019

Related U.S. Application Data

(63) Continuation of application No. PCT/CN2016/113970, filed on Dec. 30, 2016.

(51) Int. Cl.
*H04W 52/24* (2009.01)
*H04B 17/10* (2015.01)
(Continued)

(52) U.S. Cl.
CPC .......... *H04W 52/241* (2013.01); *H01Q 1/245* (2013.01); *H04B 1/3838* (2013.01);
(Continued)

(58) Field of Classification Search
CPC .................................................. H04W 52/241
See application file for complete search history.

(56) References Cited

U.S. PATENT DOCUMENTS

| 2012/0077538 A1* | 3/2012 | Yun ...................... H04B 1/3838 455/522 |
| 2016/0270001 A1* | 9/2016 | Hao .................... H04W 52/283 |

FOREIGN PATENT DOCUMENTS

| CN | 202533576 U | 11/2012 |
| CN | 104113904 A | 10/2014 |
| CN | 104581896 A | 4/2015 |

OTHER PUBLICATIONS

International Search Report (and English Translation) and Written Opinion of the International Searching Authority for PCT/CN2016/113970 dated Sep. 28, 2017.

* cited by examiner

*Primary Examiner* — Ankur Jain
(74) *Attorney, Agent, or Firm* — Heslin Rothenberg Farley & Mesiti P.C.

(57) ABSTRACT

A method and a terminal for controlling transmission power are disclosed. The method includes: after determining that a human body is close to the terminal, measuring a distance between the human body and the terminal by using a radio frequency fingerprint identification circuit; and controlling transmission power of an antenna in a radio frequency antenna unit based on the distance. In this way, no separate SAR reduction sensor module circuit needs to be added to measure a parasitic capacitance generated when the human body is close to the intelligent terminal, greatly reducing complexity of a hardware design of a radio frequency module. In this embodiment of the present disclosure, the transmission power is controlled based on the distance between the human body and the terminal, thereby enabling the control of the transmission power to have relatively high precision and accuracy.

20 Claims, 5 Drawing Sheets

(51) Int. Cl.
*H01Q 1/24* (2006.01)
*H04B 1/3827* (2015.01)
*H04W 52/18* (2009.01)

(52) U.S. Cl.
CPC .......... *H04B 17/103* (2015.01); *H04W 52/18* (2013.01); *H04W 52/243* (2013.01)

METHOD AND TERMINAL FOR CONTROLLING TRANSMISSION POWER

CROSS REFERENCE TO RELATED APPLICATIONS

The present disclosure is a continuation of International Application Serial No. PCT/CN2016/113970, filed on Dec. 30, 2016, which is hereby incorporated by reference in its entirety.

TECHNICAL FIELD

The present disclosure relates to the field of communications technologies, and more particularly, to a method and a terminal for controlling transmission power.

BACKGROUND

With continuous development of communications technologies, various intelligent terminals are more widely applied, and have become an important part of people's daily life and work. However, at the same time, an electromagnetic radiation problem caused by the intelligent terminals attracts more attention. To reduce impact of electromagnetic radiation from an intelligent terminal on a human body, and protect health of the human body, the intelligent terminal usually needs to be controlled to reduce transmission power of a radio frequency antenna when the human body is close to, so that the transmission power meets a specific absorption rate (SAR) standard for authentication.

In the existing technology, an SAR reduction sensor module is usually disposed in an intelligent terminal to adjust transmission power of a radio frequency module. A parasitic capacitance generated when a human body is close to the intelligent terminal is measured by using a charge transfer method, to detect whether a human body is close to the intelligent terminal. If a human body close to the intelligent terminal is detected, largest transmission power of the radio frequency module is adjusted from a relatively large power value to a relatively small power value. In this way, it is necessary to add a separate SAR reduction sensor module circuit in the intelligent terminal, which will make hardware design of the radio frequency module more complicated.

In a conclusion, currently, a method for controlling transmission power is urgently needed, to not only reduce the complexity of the hardware design of the radio frequency module, but also effectively control the transmission power of the terminal.

SUMMARY

The present disclosure provides a method and a terminal for controlling transmission power, which are used to effectively control the transmission power of the terminal on the basis of reducing complexity of hardware design of a radio frequency module.

The present disclosure provides a method for controlling transmission power. The method is applicable to a terminal, where the terminal includes a radio frequency antenna unit and a radio frequency fingerprint identification circuit, the radio frequency antenna unit includes at least one antenna, and the method includes:

after determining that a human body is close to the terminal, measuring a distance between the human body and the terminal by using the radio frequency fingerprint identification circuit; and controlling transmission power of an antenna in the radio frequency antenna unit based on the distance between the human body and the terminal.

In the foregoing method procedure, the terminal further includes an infrared detection unit;

the determining that a human body is close to the terminal includes:

after detecting, by using the radio frequency fingerprint identification circuit, that the human body is close to the terminal, starting the infrared detection unit to detect a temperature of the human body, and after the temperature of the human body satisfies a preset condition, determining that the human body is close to the terminal.

In the foregoing method procedure, a reflected electromagnetic wave transmitted by a target object is received by using the radio frequency fingerprint identification circuit, and if it is determined that a feature of the reflected electromagnetic wave conforms to an inherent electromagnetic wave feature of a reflected electromagnetic wave of the human body, determining that the human body is close to the terminal; where the inherent electromagnetic wave feature of the reflected electromagnetic wave of the human body includes a dielectric constant of greater than 26 and less than 80 and a relative refractive index of greater than 4 and less than 8.

In the foregoing method procedure, the terminal includes N antenna areas, at least one antenna is disposed in each of the N antenna areas, and N is a positive integer.

the measuring a distance between the terminal and the human body by using the radio frequency fingerprint identification circuit includes:

measuring a distance between each of the N antenna areas and the human body by using the radio frequency fingerprint identification circuit.

the controlling transmission power of the antenna based on the distance between the terminal and the human body includes:

controlling, for each of the N antenna areas, transmission power of an antenna in each antenna area based on the distance between each antenna area and the human body.

In the foregoing method procedure, the controlling transmission power of an antenna in each antenna area based on the distance between each antenna area and the human body includes:

determining, based on the distance between each antenna area and the human body and a correspondence between the distance and the transmission power that correspond to each antenna area, a target transmission power corresponding to the distance between each antenna area and the human body, and adjusting the transmission power of the antenna in each antenna area to the target transmission power.

In the foregoing method procedure, the controlling transmission power of the antenna based on the distance between the terminal and the human body further includes:

determining, based on a first distance and a correspondence between a distance and transmission power, a target transmission power corresponding to the first distance, and adjusting the transmission power of the antenna in the N antenna areas to the target transmission power, where the first distance is a distance between a first antenna area and the human body, the first antenna area belongs to the N antenna areas, and the distance between the first antenna area and the human body is the smallest.

In the foregoing method procedure, the measuring a distance between the human body and the terminal by using the radio frequency fingerprint identification circuit includes:

transmitting an electromagnetic wave based on a first preset period by using the radio frequency fingerprint identification circuit, and measuring the distance between the human body and the terminal based on the reflected electromagnetic wave of the human body received by the radio frequency fingerprint identification circuit.

The foregoing method procedure further includes:

after determining that the distance between the human body and the terminal is greater than or equal to a preset distance, transmitting the electromagnetic wave based on a second preset period by using the radio frequency fingerprint identification circuit, where the second preset period is greater than the first preset period.

Based on a same inventive concept, the present disclosure provides a terminal. The terminal includes a radio frequency antenna unit and a radio frequency fingerprint identification circuit, the radio frequency antenna unit includes at least one antenna, and the terminal further includes:

a determining module, configured to: after determining that a human body is close to the terminal, measure a distance between the human body and the terminal by using the radio frequency fingerprint identification circuit; and a processing module, configured to control transmission power of an antenna in the radio frequency antenna unit based on the distance between the human body and the terminal.

The terminal further includes an infrared detection unit.

the determining module is further configured to:

after detecting, by using the radio frequency fingerprint identification circuit, that the human body is close to the terminal, start the infrared detection unit to detect a temperature of the human body, and after the temperature of the human body satisfies a preset condition, determine that the human body is close to the terminal.

In the terminal, the determining module is specifically configured to:

receive a reflected electromagnetic wave transmitted by a target object, and if determining that a feature of the reflected electromagnetic wave conforms to an inherent electromagnetic wave feature of a reflected electromagnetic wave of the human body, determine that the human body is close to the terminal, where the inherent electromagnetic wave feature of the reflected electromagnetic wave of the human body includes a dielectric constant of greater than 26 and less than 80 and a relative refractive index of greater than 4 and less than 8.

In the terminal, the terminal includes N antenna areas, at least one antenna is disposed in each of the N antenna areas, and N is a positive integer.

the determining module is specifically configured to:

measure a distance between each of the N antenna areas and the human body by using the radio frequency fingerprint identification circuit.

the processing module is specifically configured to:

control, for each of the N antenna areas, transmission power of an antenna in each antenna area based on the distance between each antenna area and the human body.

In the terminal, the processing module is specifically configured to:

determine, based on the distance between each antenna area and the human body and a correspondence between the distance and the transmission power that correspond to each antenna area, target transmission power corresponding to the distance between each antenna area and the human body, and adjust the transmission power of the antenna in each antenna area to the target transmission power.

In the terminal, the processing module is further configured to:

determine, based on a first distance and a correspondence between a distance and transmission power, target transmission power corresponding to the first distance, and adjust the transmission power of the antenna in the N antenna areas to the target transmission power, where the first distance is a distance between a first antenna area and the human body, the first antenna area belongs to the N antenna areas, and the distance between the first antenna area and the human body is the smallest.

In the terminal, the determining module is specifically configured to:

transmit an electromagnetic wave based on a first preset period by using the radio frequency fingerprint identification circuit, and measure the distance between the human body and the terminal based on the reflected electromagnetic wave of the human body received by the radio frequency fingerprint identification circuit.

the determining module is further configured to:

after determining that the distance between the human body and the terminal is greater than or equal to a preset distance, transmit the electromagnetic wave based on a second preset period by using the radio frequency fingerprint identification circuit, where the second preset period is greater than the first preset period.

Based on the same inventive concept, the present disclosure provides another terminal, including: at least one processor;

a radio frequency antenna unit and a radio frequency fingerprint identification circuit that are in communication connection with the at least one processor; and a memory in communication connection with the at least one processor; where the radio frequency antenna unit includes at least one antenna; and the memory stores an instruction that can be executed by the at least one processor, and the instruction is executed by the at least one processor, to enable the at least one processor in combination with the radio frequency antenna unit and the radio frequency fingerprint identification circuit to:

after determining that a human body is close to the terminal, measure a distance between the human body and the terminal by using the radio frequency fingerprint identification circuit; and control transmission power of an antenna in the radio frequency antenna unit based on the distance between the human body and the terminal.

The terminal further includes an infrared detection unit in communication with the at least one processor;

the processor is configured to:

after detecting, by using the radio frequency fingerprint identification circuit, that the human body is close to the terminal, start the infrared detection unit to detect a temperature of the human body, and after the temperature of the human body satisfies a preset condition, determine that the human body is close to the terminal.

In the terminal, the processor is configured to:

receive, by using the radio frequency fingerprint identification circuit, a reflected electromagnetic wave transmitted by a target object, and if determining that a feature of the reflected electromagnetic wave conforms to an inherent electromagnetic wave feature of a reflected electromagnetic wave of the human body, determine that the human body is close to the terminal, where the inherent electromagnetic wave feature of the reflected electromagnetic wave of the human body includes a dielectric constant of greater than 26 and less than 80 and a relative refractive index of greater than 4 and less than 8.

In the terminal, the terminal includes N antenna areas, at least one antenna is disposed in each of the N antenna areas, and N is a positive integer; and the processor is specifically configured to:

measure a distance between each of the N antenna areas and the human body by using the radio frequency fingerprint identification circuit; and control, for each of the N antenna areas, transmission power of an antenna in each antenna area based on the distance between each antenna area and the human body.

In the terminal, the processor is specifically configured to:

determine, based on the distance between each antenna area and the human body and a correspondence between the distance and the transmission power that correspond to each antenna area, a target transmission power corresponding to the distance between each antenna area and the human body, and adjust the transmission power of the antenna in each antenna area to the target transmission power.

In the terminal, the processor is specifically further configured to:

determine, based on a first distance and a correspondence between a distance and transmission power, a target transmission power corresponding to the first distance, and adjust the transmission power of the antenna in the N antenna areas to the target transmission power, where the first distance is a distance between a first antenna area and the human body, the first antenna area belongs to the N antenna areas, and the distance between the first antenna area and the human body is the smallest.

In the terminal, the processor is further configured to:

transmit an electromagnetic wave based on a first preset period by using the radio frequency fingerprint identification circuit, and measure the distance between the human body and the terminal based on the reflected electromagnetic wave of the human body received by the radio frequency fingerprint identification circuit; and after determining that the distance between the human body and the terminal is greater than or equal to a preset distance threshold, transmit the electromagnetic wave based on a second preset period by using the radio frequency fingerprint identification circuit, where the second preset period is greater than the first preset period.

Based on the same inventive concept, the present disclosure provides a non-volatile computer storage medium. The non-volatile computer storage medium stores a computer executable instruction. The computer executable instruction is used for enabling a computer to perform any one of the foregoing methods for controlling transmission power.

Based on the same inventive concept, the present disclosure provides a computer program product. The computer program product includes a computing program stored in a non-transient computer readable storage medium, the computer program includes a computer executable instruction, and when the computer executable instruction is executed by a computer, the computer is enabled to perform any one of the foregoing methods for controlling transmission power.

According to the method and terminal provided in the present disclosure, the transmission power of the antenna in the radio frequency antenna unit may be controlled based on the distance between the human body and the terminal, so that a parasitic capacitance generated when the human body is close to the intelligent terminal does not need to be measured, in other words, no separate SAR reduction sensor module circuit needs to be added, thereby greatly reducing complexity of a hardware design of a radio frequency module. In addition, in the existing technology, the order of magnitude of the change in the parasitic capacitance generated when the human body is close to the intelligent terminal is small, and there are a large number of interference sources. Consequently, incorrect measurement easily occurs, causing transmission power control to be not sufficiently accurate and proper. However, in the embodiments of the present disclosure, the transmission power is controlled based on the distance between the human body and the terminal. The order of magnitude of the change in the distance between the human body and the terminal is far greater than the order of magnitude of the change in the parasitic capacitance, and there are relatively few interference sources. Therefore, the measured distance has relatively high precision and accuracy, thereby achieving transmission power control with relatively high precision and accuracy.

BRIEF DESCRIPTION OF THE DRAWINGS

In order to more clearly illustrate the technical solutions of the present disclosure or the existing technology, the accompanying drawings to be used for describing the embodiments or the existing technology will be briefly described below. Apparently, the accompanying drawings in the following description show some embodiments of the present disclosure, and that any modifications, improvements or variations of various equivalents made by a person of ordinary skill in the art after reading the present disclosure fall within the scope of the protection claimed of the appended claims of the present disclosure.

DETAILED DESCRIPTION

To make the objectives, technical solutions, and advantages of the present disclosure clearer, the following clearly and completely describes the technical solutions in the present disclosure with reference to the accompanying drawings in the present disclosure. Apparently, the embodiments described in the following are merely some rather than all of the embodiments of the present disclosure. All other embodiments obtained by a person of ordinary skill in the art based on the embodiments of the present disclosure without creative efforts shall fall within the protection scope of the present disclosure.

A method for controlling transmission power provided in the present disclosure may be applicable to a terminal. The terminal may be a mobile terminal. The mobile terminal may be a handheld device having a wireless connection function, another processing device connected to a wireless modem, or a terminal that communicates with one or more core networks by using a radio access network. For example, the mobile terminal may be a mobile phone, a tablet computer, a mobile Internet device (MID), or a wearable device. For another example, the mobile terminal may be a portable, a pocket-sized, a handheld, a computer-built-in, or an in-vehicle mobile device. For still another example, the mobile terminal may be a part of user equipment (UE).

For ease of description of the method for controlling transmission power in the present disclosure, the following exemplarily describes a specific structure of the terminal to which the method is applicable.

Specifically, in an example, the terminal includes at least a display screen, a radio frequency fingerprint identification circuit, and an infrared detection unit.

Figure 1A:
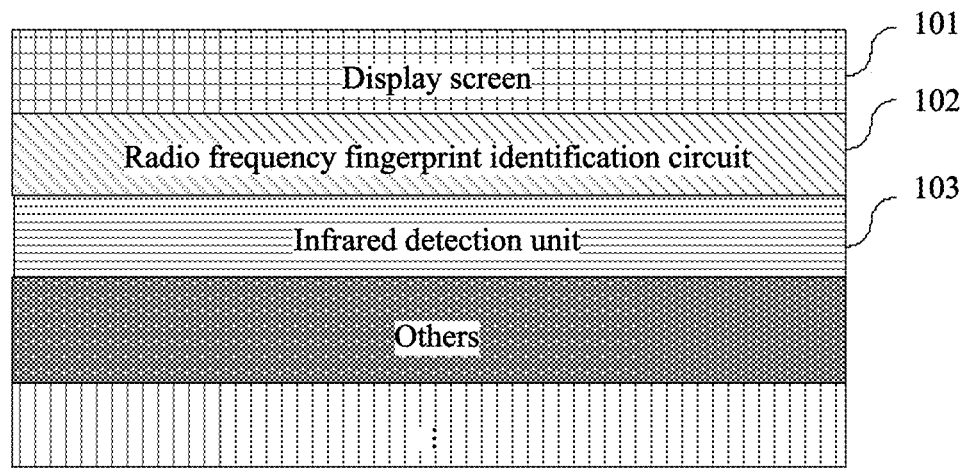
FIG. 1a is a schematic cross-sectional diagram of a terminal according to an embodiment of the present disclosure.
Figure 1B:
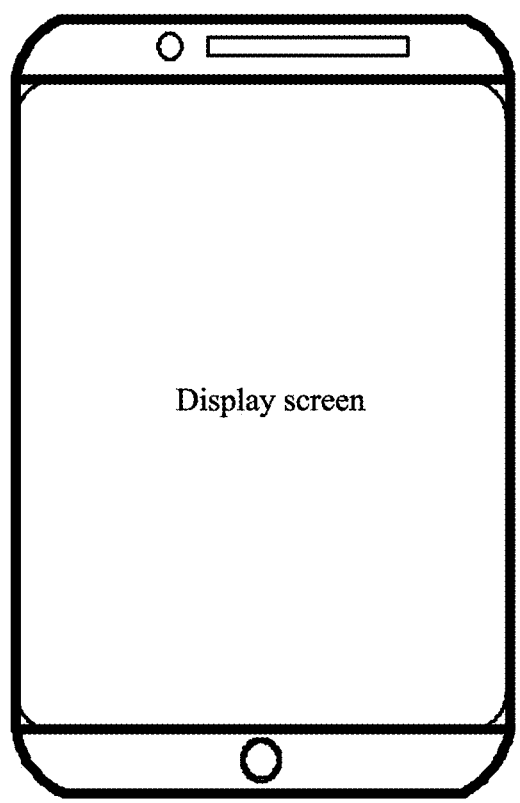
FIG. 1b is a schematic plane diagram of a terminal according to an embodiment of the present disclosure.

FIG. 1a is a schematic diagram of a cross section of a terminal according to an embodiment of the present disclosure. FIG. 1b is a schematic planar diagram of a terminal according to an embodiment of the present disclosure.

As shown in FIG. 1a, from the top down, the cross section mainly includes a layer 101 on which the display screen is located, a layer 102 on which the radio frequency fingerprint identification circuit is located, a layer 103 on which the infrared detection unit is located, and may further include a layer on which another module is located. Details are not described herein.

As the layer 102 on which the radio frequency fingerprint identification circuit is located, the layer 103 on which the infrared detection unit is located, and the like are all located below the layer 101 on which the display screen is located. Therefore, the display screen is shown in FIG. 1b, but the radio frequency fingerprint identification circuit and the infrared detection unit are not shown.

Further, the display screen of the terminal may be a touch display screen, such as a resistive touchscreen, a capacitive touchscreen, an infrared touchscreen, or a surface acoustic wave touchscreen, and the like.

Figure 2:
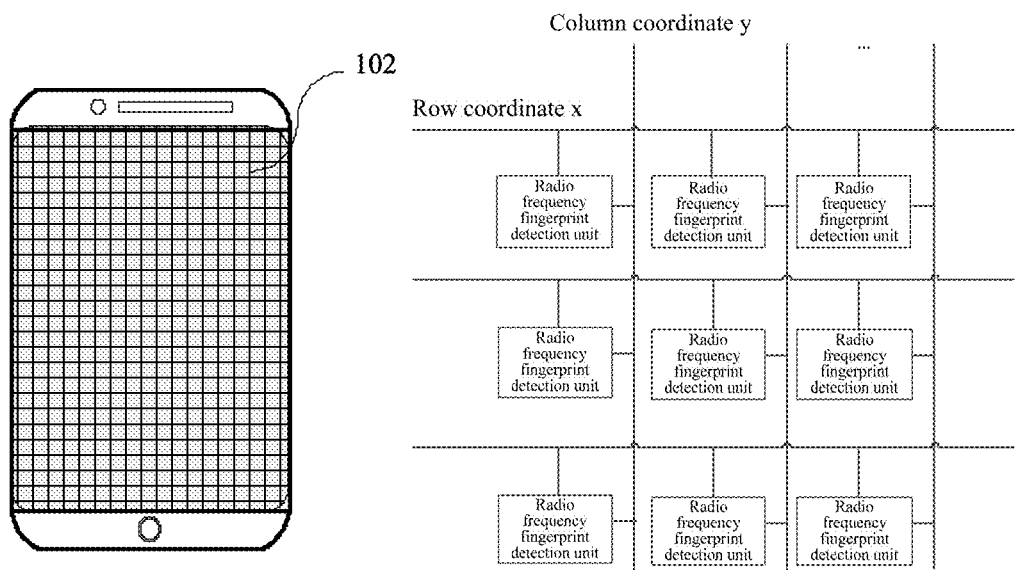
FIG. 2 is a schematic structural diagram of a radio frequency fingerprint identification circuit according to an embodiment of the present disclosure.

The radio frequency fingerprint identification circuit may be a two-dimensional array integrated circuit disposed below the display screen of the terminal, and a size thereof may be the same as a size of the terminal. FIG. 2 is a schematic structural diagram of a radio frequency fingerprint identification circuit 102 according to an embodiment of the present disclosure. As shown in FIG. 2, the radio frequency fingerprint identification circuit 102 includes two-dimensional arrays. Each grid point in a two-dimensional array is a radio frequency fingerprint detection unit, and may correspond to one coordinate (x, y) in the two-dimensional array.

Figure 3:
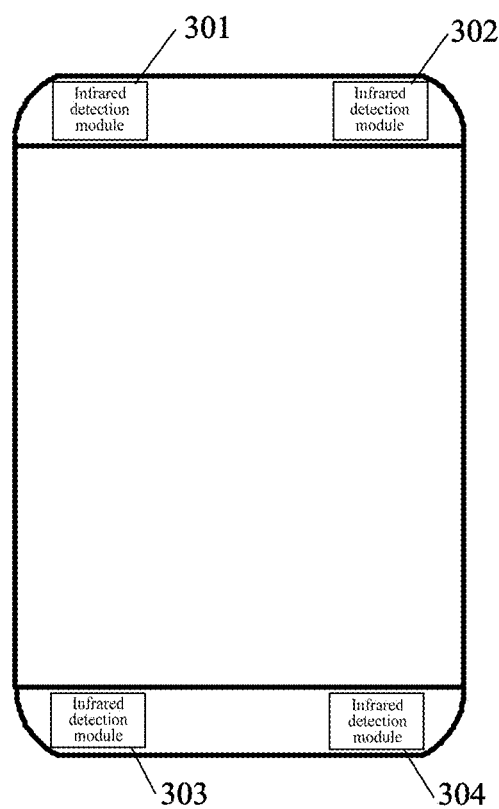
FIG. 3 is a schematic diagram of a location at which an infrared detection unit is disposed according to an embodiment of the present disclosure.

The infrared detection unit may include a plurality of infrared detection modules, and each of the infrared detection modules may be respectively disposed in corners of the layer on which the infrared detection unit is located. In the embodiment of the present disclosure, a quantity of infrared detection modules may be set by a person skilled in the art based on an actual requirement, and is not specifically limited herein. Preferably, the infrared detection unit 105 may include four infrared detection modules. FIG. 3 is a schematic diagram of a location at which an infrared detection unit is disposed according to an embodiment of the present disclosure. As shown in FIG. 3, four infrared detection modules (namely, an infrared detection module 301, an infrared detection module 302, an infrared detection module 303, and an infrared detection module 304) are respectively disposed in four corners of a layer where the infrared detection unit is located.

It should be noted that, the terminal further includes a radio frequency antenna unit, and the radio frequency antenna unit includes at least one antenna configured to transmit a radio frequency signal outward. A structure thereof is temporarily not shown in FIG. 1a and FIG. 1b.

In the embodiment of the present disclosure, the terminal has one or more antennas, and locations of the antennas are different from each other in the terminal. Usually, when a person uses the terminal, for example, holds a smartphone by a hand to answer or make a call, distances between different locations of the terminal and a human body are different. Therefore, to ensure that when each antenna in the terminal transmits a radio frequency signal outward, electromagnetic radiation (namely, an SAR) to the human body conforms to a standard, transmission power of the radio frequency signal should be properly reduced for an antenna disposed in a terminal area relatively close to the human body, and a shorter distance from the human body indicates more reduction of transmission power for an antenna. Based on this, in the embodiment of the present disclosure, a plurality of different antenna areas may be assigned on the terminal, and transmission power of a radio frequency signal transmitted by an antenna in each antenna area is respectively controlled by measuring a distance between the human body and each antenna area, so that on the basis that without affecting radio frequency performance of the terminal, thereby reducing electromagnetic radiation to the human body from a radio frequency signal transmitted by the terminal, and better protecting health of the human body.

A quantity of antenna areas specifically assigned may be determined by a person skilled in the art based on a quantity of antennas in the terminal and locations of the antennas. For example, two antenna areas, three antenna areas, four antenna areas, or the like may be assigned. The specific example is not limited.

Figure 4:
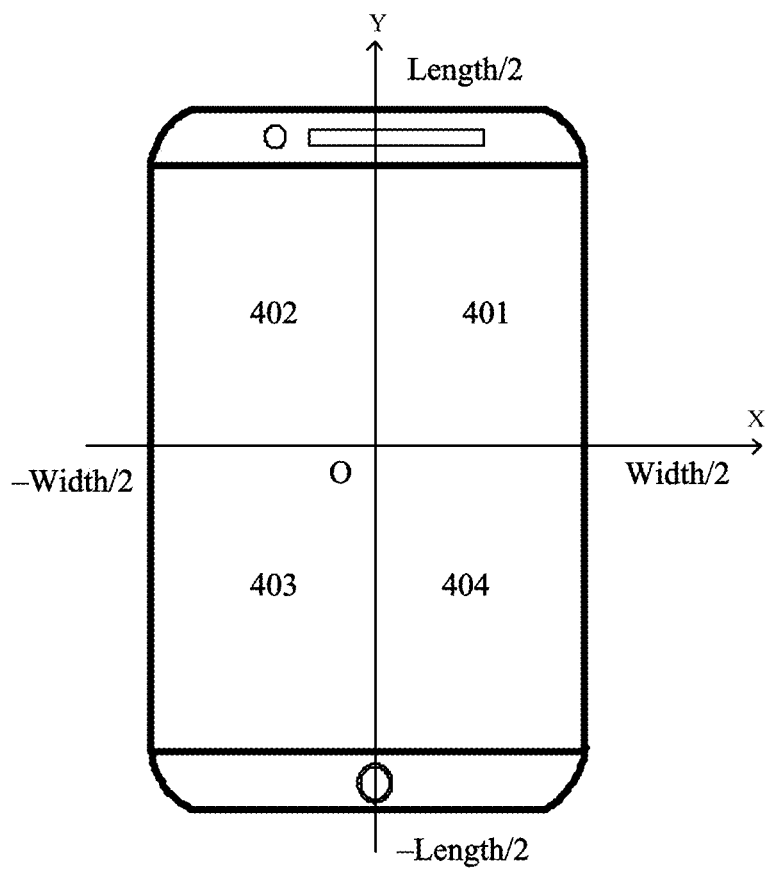
FIG. 4 is a schematic diagram of assigning four antenna areas on a terminal according to an embodiment of the present disclosure.

For example, FIG. 4 is a schematic diagram of assigning four antenna areas on a terminal. As shown in FIG. 4, the terminal is a smartphone. A length thereof is length, a width thereof is width, the origin of coordinates is located at the center of the terminal, a coordinate axis x and a coordinate axis y define four antenna areas on the smartphone, namely, a first antenna area 401, a second antenna area 402, a third antenna area 403, and a fourth antenna area 404.

It should be noted that, sizes of the plurality of assigned antenna areas may be the same, or may be different. The specific example is not limited. In the embodiment of the present disclosure, no antenna area may be assigned. In this case, all antennas in the radio frequency antenna unit may be considered to be located in one antenna area.

Figure 5:
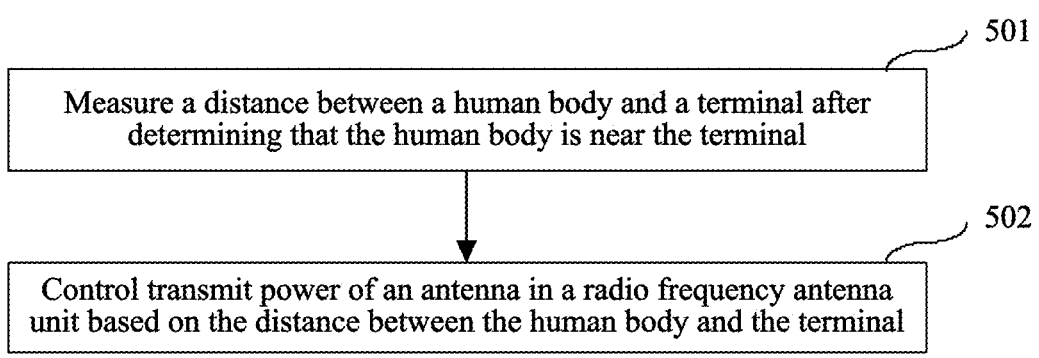
FIG. 5 is a schematic flowchart of a method for controlling transmission power according to an embodiment of the present disclosure.

Based on the structure of the terminal described above, FIG. 5 is a schematic flowchart of a method for controlling transmission power according to the present disclosure. As shown in FIG. 5, the method includes the following steps:

Step 501: Measuring a distance between a human body and the terminal after determining that the human body is close to the terminal;

Step 502: Controlling transmission power of an antenna in the radio frequency antenna unit based on the distance between the human body and the terminal.

In the embodiment of the present disclosure, the transmission power of the antenna in the radio frequency antenna unit is controlled based on the distance between the human body and the terminal, so that a parasitic capacitance generated when the human body is close to the intelligent terminal does not need to be measured, in other words, no separate SAR reduction sensor module circuit needs to be added, which greatly reducing complexity of a hardware design of a radio frequency module. In addition, in the existing technology, the order of magnitude of the change in the parasitic capacitance generated when the human body is close to the intelligent terminal is small, and there are a large number of interference sources. Consequently, incorrect measurement easily occurs, causing transmission power control to be not sufficiently accurate and proper. However, in the embodiment of the present disclosure, the transmission power is controlled based on the distance between the human body and the terminal. The order of magnitude of the change in the distance between the human body and the terminal is far greater than the order of magnitude of the change in the parasitic capacitance, and there are relatively few interference sources. Therefore, the measured distance has relatively high precision and accuracy, thereby achieving transmission power control with relatively high precision and accuracy.

Specifically, in step 501, the determining that the human body is close to the terminal may include: after detecting, by using the radio frequency fingerprint identification circuit, that the human body is close to the terminal, starting the infrared detection unit to detect a temperature of the human body, and after the temperature of the human body satisfies a preset condition, determining that the human body is close to the terminal. The preset condition may be set by the person skilled in the art based on experience. For example, the preset condition may be that the temperature is greater than or equal to 35° C. and less than 40° C.

Because dielectric constants and relative refractive indexes of different mediums are different, the different mediums have different responses to an electromagnetic wave, in other words, have different reflection forms and reflection energy for an electromagnetic wave. For the human body, because most content of the human body is water, and a model analysis of the human body shows that, at different frequencies, for different layers (including a muscle layer, a fat layer, a skin layer, and the like) of the human body, dielectric constants are between 26 and 28, and relative refractive indexes are between 4 and 8, therefore, a feature of an electromagnetic wave reflected back by the human body may be detected based on this inherent electromagnetic property of the human body by using the radio frequency fingerprint identification circuit, to determine whether the human body is close to the terminal.

Specifically, a reflected electromagnetic wave transmitted by a target object is received by using the radio frequency fingerprint identification circuit, and if it is determined that a feature of the reflected electromagnetic wave conforms to an inherent electromagnetic wave feature of a reflected electromagnetic wave of the human body, it is determined that the human body is close to the terminal. The inherent electromagnetic wave feature of the reflected electromagnetic wave of the human body includes a dielectric constant of greater than 26 and less than 80, and a relative refractive index of greater than 4 and less than 8.

After it is detected, by using the radio frequency fingerprint identification circuit, that the human body is close to the terminal, to avoid a detection error, the infrared detection unit may be started to detect again whether the human body is close to the terminal. Specifically, the infrared detection unit may detect, by transmitting an infrared ray outward, a temperature of an object close to the terminal, and if determining that the detected temperature is about 37° C. may determine that the human body is close to the terminal. In this way, accuracy of determining that the human body is close to the terminal is greatly improved by using the radio frequency fingerprint identification circuit and the infrared detection unit.

It should be noted that, in the embodiment of the present disclosure, alternatively, it may be first detected, by using the infrared detection unit, that the human body is close to the terminal, and then detection may be performed by using the radio frequency fingerprint identification circuit, to further determine that the human body is close to the terminal; or simultaneous detection may be performed by using the infrared detection unit and the radio frequency fingerprint identification circuit, to determine that the human body is close to the terminal. In the embodiment of the present disclosure, the radio frequency fingerprint identification circuit performs detection by using the electromagnetic wave, and energy consumption is low. Therefore, preferably, after it is first detected, by using the radio frequency fingerprint identification circuit, that the human body is close to the terminal, the infrared detection unit is started to detect again whether the human body is close to the terminal, to save energy.

Further, after it is determined that the human body is close to the terminal, the radio frequency fingerprint identification circuit may be started, to transmit an electromagnetic wave to the human body, and measure the distance between the human body and the terminal based on the received electromagnetic wave reflected by the human body. Specifically, the distance between the human body and the terminal may be measured by using a plurality of radio frequency electromagnetic wave distance measurement methods, including an electromagnetic phase distance measurement method.

In the embodiment of the present disclosure, the radio frequency fingerprint identification circuit includes a plurality of radio frequency fingerprint detection units, and each radio frequency fingerprint detection unit may collect various fingerprint information including a distance between the human body and the radio frequency fingerprint detection unit, and store the collected fingerprint information on the terminal. For example, each radio frequency fingerprint detection unit may transmit an electromagnetic wave to the human body, and detect a distance between the radio frequency fingerprint detection unit and the human body based on the received electromagnetic wave reflected back by the human body. A format of distance information detected by the radio frequency fingerprint detection unit may be (x,y,d). (x,y) indicates a coordinate of the radio frequency fingerprint detection unit on the display screen, and d is a distance that is between the radio frequency fingerprint detection unit corresponding to the coordinate (x,y) and that is detected by the radio frequency fingerprint detection unit.

Using the antenna areas shown in FIG. 4 as an example, in the embodiment of the present disclosure, based on the assigned antenna areas, an antenna area of each radio frequency fingerprint detection unit may be determined based on a location of each radio frequency fingerprint detection unit. Specifically, if a coordinate (x,y) of a radio frequency fingerprint detection unit satisfies a condition: $0<x<\text{width}/2$ and $0<y<\text{length}/2$, it is determined that the radio frequency fingerprint detection unit is located in a first antenna area. Similarly, if the coordinate (x,y) of the radio frequency fingerprint detection unit satisfies a condition:

−width/2<x<0 and 0<y<length/2, it is determined that the radio frequency fingerprint detection unit is located in a second antenna area. If the coordinate (x,y) of the radio frequency fingerprint detection unit satisfies a condition: −width/2<x<0 and −length/2<y<0, it is determined that the radio frequency fingerprint detection unit is located in a third antenna area. If the coordinate (x,y) of the radio frequency fingerprint detection unit satisfies a condition: 0<x<width/2 and −length/2<y<0, it is determined that the radio frequency fingerprint detection unit is located in a fourth antenna area.

After the antenna area of each radio frequency fingerprint detection unit is determined, for each antenna area, a smallest value of distances between radio frequency fingerprint detection units in the antenna area and the human body may be used as the distance between the antenna area and the human body. Therefore, in step 502, for each antenna area, transmission power of the antenna in each antenna area may be controlled based on the distance between each antenna area and the human body.

In the embodiment of the present disclosure, a preset distance threshold may be set on the terminal. When a distance between an antenna area and the human body is less than the preset distance threshold, the terminal may control and reduce transmission power of each antenna in the antenna area based on the distance between the antenna area and the human body. When a distance between an antenna area and the human body is greater than or equal to the preset distance threshold, the terminal keeps transmission power of each antenna in the antenna area unchanged.

Further, a plurality of distance thresholds may be set in the terminal, and a distance between an antenna area and the human body may be divided into multiple distance ranges. Each distance range corresponds to one target transmission power.

For example, a first distance threshold a1, a second distance threshold a2, and a third distance threshold a3 are set in the terminal, the first distance threshold a1 is equal to the preset distance threshold and greater than the second distance threshold a2, and the second distance threshold a2 is greater than the third distance threshold a3. As a result, distance ranges assigned for the distance thresholds are respectively: [0, a3], (a3, a2], and (a2, a1]; transmission power respectively corresponding to the distance ranges are: a third target transmission power, a second target transmission power, and a first target transmission power; and the third target transmission power is less than the second target transmission power, and the second target transmission power is less than the first target transmission power. Specifically, Table 1 shows an example of a correspondence between the target transmission power and the distance ranges.

TABLE 1

Example of the correspondence between the target transmission power and the distance ranges

| | Distance range | | |
|---|---|---|---|
| | [0, a3] | (a3, a2] | (a2, a1] |
| Target transmission power | Third target transmission power | Second target transmission power | First target transmission power |

Based on Table 1, the terminal may compare the distance between the antenna area and the human body with the distance ranges. If the distance is in a distance range, transmission power of an antenna in the antenna area is adjusted to the target transmission power corresponding to the distance range. For example, if a distance between an antenna area of the terminal and the human body is in the distance range (a3, a2], transmission power of each antenna in the antenna area may be adjusted to the second target transmission power.

In the embodiment of the present disclosure, values of the distance thresholds, a quantity of distance thresholds, and target transmission power corresponding to the distance ranges may be specifically set by the person skilled in the art based on an actual requirement and an SAR test standard.

For example, if the distance thresholds that are set on the terminal are respectively 1 mm, 3 mm, and 5 mm, when a distance between an antenna area and the human body is greater than 3 mm and less than 5 mm, largest transmission power of an antenna in the antenna area is reduced by 3 dB; when the distance is greater than 1 mm and less than 3 mm, the largest transmission power is reduced by 4 dB; and when the distance is less than 1 mm, the largest transmission power is reduced by 5 dB.

Certainly, in step 502, the terminal may further determine, based on a correspondence between a distance and transmission power, target transmission power corresponding to the first distance, and adjust the transmission power of the antenna in the N antenna areas to the target transmission power, where the first distance is a distance between a first antenna area and the human body, the first antenna area belongs to the N antenna areas, and the distance between the first antenna area and the human body is the smallest.

In other words, the terminal may control transmission power of antennas in all antenna areas based on a smallest value of distances between the antenna areas and the human body. Specifically, the smallest value of the distances between the antenna areas and the human body may be compared with the distance thresholds, to determine the target transmission power, and the transmission power of the antennas in all the antenna areas in the terminal adjusted to the target transmission power.

In the embodiment of the present disclosure, in step 501, after it is determined that the human body is close to the terminal, the distance between the human body and the terminal may be measured by transmitting an electromagnetic wave to the human body based on a first preset period by using the radio frequency fingerprint identification circuit. If it is subsequently determined, by using the radio frequency fingerprint identification circuit, that the distance between the human body and the terminal is greater than the preset distance threshold, it may be determined that the human body is already far away the terminal at this moment. In this case, the transmission power of the antenna in the antenna area may be restored to initial transmission power or largest transmission power, and the terminal may control the radio frequency fingerprint identification circuit to transmit an electromagnetic wave based on a second preset period, to detect whether another human body is close to the terminal. The second preset period is greater than a first preset period.

In other words, after it is determined that the human body is close to the terminal, an electromagnetic wave may be transmitted based on a shorter period to measure the distance between the human body and the terminal, so that the transmission power is controlled in time based on the distance between the human body and the terminal. If the human body is far away the terminal, an electromagnetic wave may be transmitted based on a longer period to detect whether another human body is close to the terminal, so that energy consumption can be effectively reduced.

The following describes the method for controlling transmission power in detail in the present disclosure by using a specific embodiment.

Figure 6:
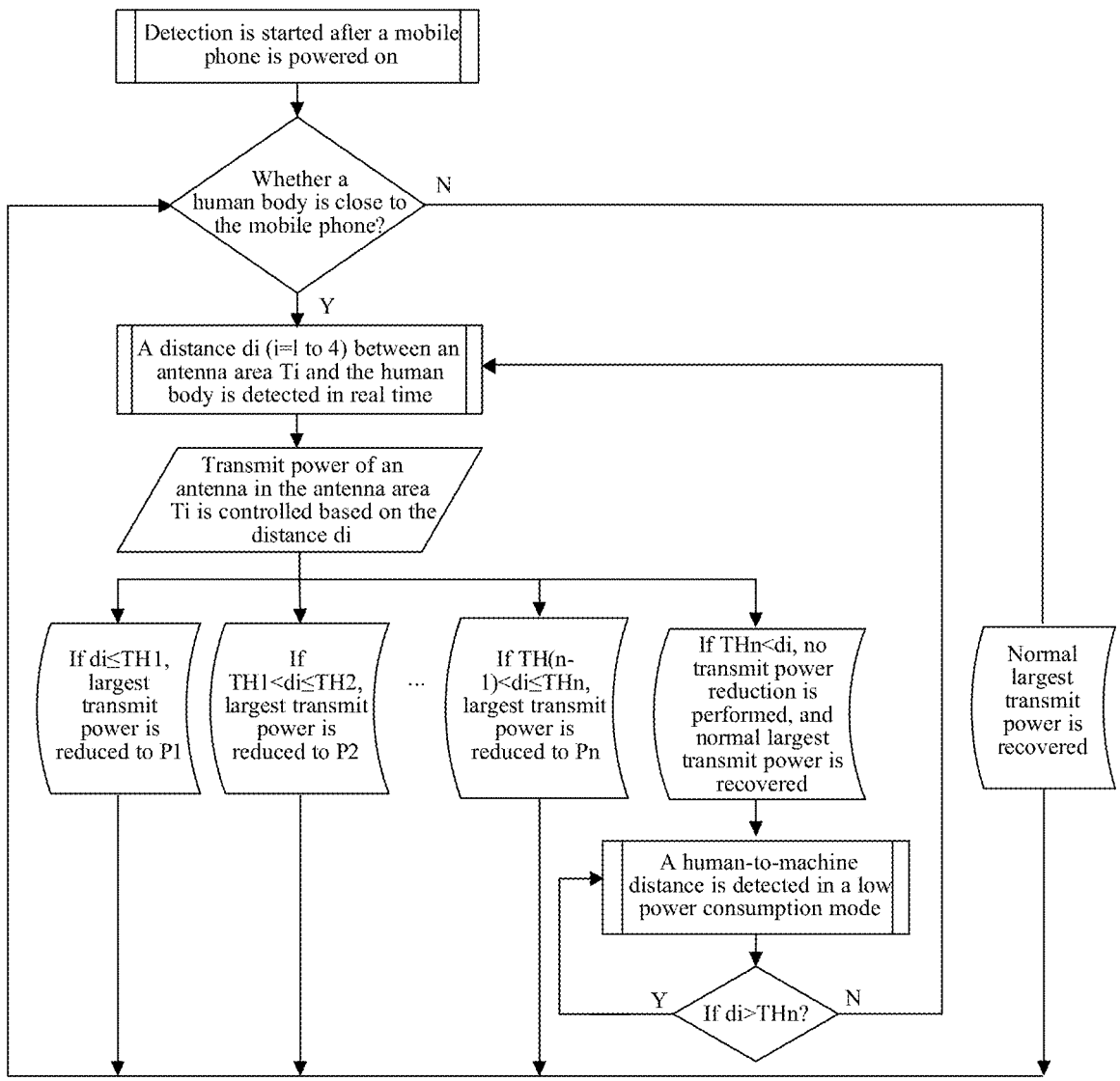
FIG. 6 is a schematic flowchart of a method for controlling transmission power according to a specific embodiment of the present disclosure.

As shown in FIG. 6, if the terminal is a smartphone, the antenna area assignment method shown in FIG. 4 is used for the smartphone, to assign four antenna areas on the smartphone, respectively, T1, T2, T3, and T4. After the mobile phone is powered on, the method for controlling transmission power shown in the embodiment of the present disclosure may be performed, to control transmission power in the antenna areas based on distances between the antenna areas and a human body.

Specifically, after the mobile phone is powered on, detecting whether a human body is close to the mobile phone is started. If it is determined that no human body is close to the mobile phone, the transmission power in the antenna areas on the mobile phone may be restored to normal largest transmission power. If it is determined that a human body is close to the mobile phone (for example, a user holds the mobile phone by a hand to answer or make a call), the distance di (i=1 to 4) between the antenna area Ti (i=1 to 4) and the human body may be detected in real time.

Correspondingly, a plurality of distance thresholds TH1 to THn are preset in the mobile phone, where n is a positive integer greater than 1. Values of the plurality of distance thresholds are respectively: TH1 is less than TH2, TH2 is less than TH3, . . . , and TH(n-1) is less than THn. In other words, THn is a preset distance threshold used for determining whether to adjust transmission power in the antenna area Ti based on the distance di between the antenna area Ti and the human body. TH1, TH2, . . . , and TH(n-1) are respectively a first distance threshold, a second distance threshold, and so on.

Using any antenna area Ti of the four antenna areas in the mobile phone as an example, if the distance between the antenna area Ti and the human body satisfies di≤TH1, the transmission power in the antenna area Ti is controlled to be reduced to P1; if the distance between the antenna area Ti and the human body satisfies TH1<di<TH2, the transmission power in the antenna area Ti is controlled to be reduced to P2; and the rest can be deduced by analogy, to be specific, if the distance between the antenna area Ti and the human body satisfies TH(n-1)≤di≤THn, the transmission power in the antenna area Ti is controlled to be reduced to Pn. P1 is less than P2, P2 is less than P3, . . . , and P(n-1) is less than Pn.

If the distance between the antenna area Ti and the human body satisfies di≥THn, power reduction is not performed on the transmission power in the antenna area Ti, but the transmission power in the antenna area Ti is restored to the normal largest transmission power, and a low power consumption mode is started to detect the distance between the antenna area Ti and the human body. In the low power consumption mode, if the detected distance di between the antenna area Ti and the human body still satisfies di≥THn, the low power consumption mode is maintained, to detect the distance from the human body. In the low power consumption mode, if the detected distance di between the antenna area Ti and the human body satisfies di≥THn, real-time detection of the distance between the antenna area Ti and the human body is started, so that the transmission power in the antenna area Ti may be subsequently controlled by using the distance di.

Figure 7:
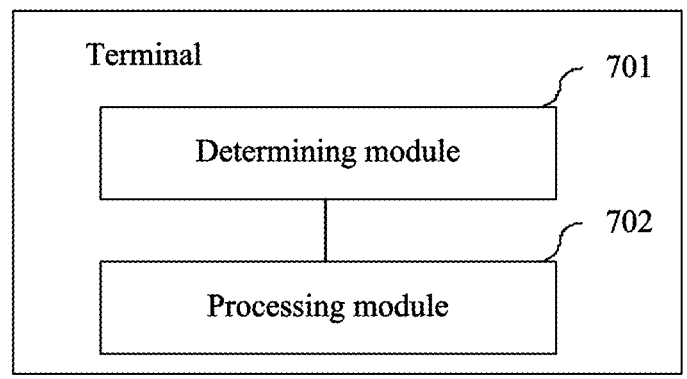
FIG. 7 is a schematic structural diagram of a terminal according to an embodiment of the present disclosure.
Figure 8:
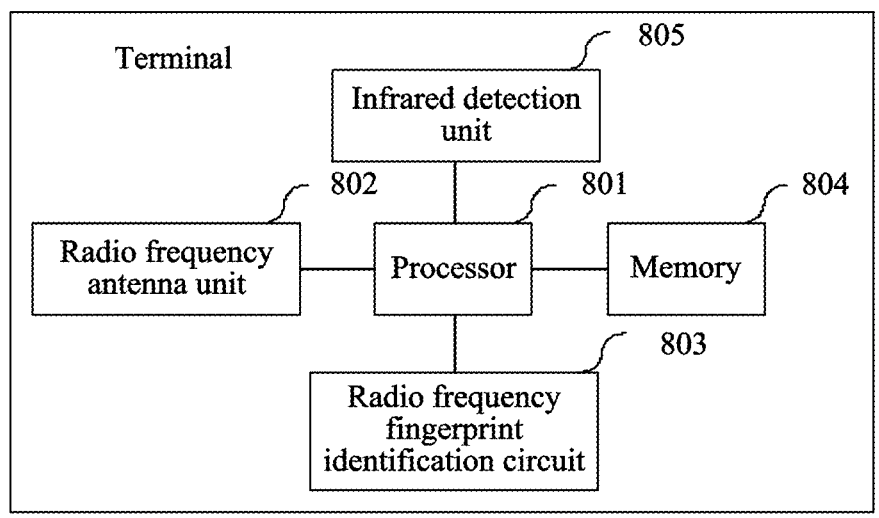
FIG. 8 is a schematic structural diagram of another terminal according to an embodiment of the present disclosure.

Based on a same technical idea, the present disclosure further provides a terminal. The terminal can perform the foregoing method embodiments. The terminal includes a radio frequency antenna unit and a radio frequency fingerprint identification circuit. The radio frequency antenna unit includes at least one antenna. As shown in FIG. 7, the terminal includes:

a determining module 701, configured to: after determining that a human body is close to the terminal, measure a distance between the human body and the terminal by using the radio frequency fingerprint identification circuit; and a processing module 702, configured to control transmission power of an antenna in the radio frequency antenna unit based on the distance between the human body and the terminal.

In the terminal, the terminal further includes an infrared detection unit.

the determining module 701 is further configured to:

after detecting, by using the radio frequency fingerprint identification circuit, that the human body is close to the terminal, start the infrared detection unit to detect a temperature of the human body, and after the temperature of the human body satisfies a preset condition, determine that the human body is close to the terminal.

In the terminal, the determining module 701 is specifically configured to:

receive, by using the radio frequency fingerprint identification circuit, a reflected electromagnetic wave transmitted by a target object, and if determining that a feature of the reflected electromagnetic wave conforms to an inherent electromagnetic wave feature of a reflected electromagnetic wave of the human body, determine that the human body is close to the terminal, where the inherent electromagnetic wave feature of the reflected electromagnetic wave of the human body includes a dielectric constant of greater than 26 and less than 80 and a relative refractive index of greater than 4 and less than 8.

In the terminal, the terminal includes N antenna areas, at least one antenna is disposed in each of the N antenna areas, and N is a positive integer.

the determining module 701 is specifically configured to:

measure a distance between each of the N antenna areas and the human body by using the radio frequency fingerprint identification circuit.

the processing module 702 is specifically configured to:

control, for each of the N antenna areas, transmission power of an antenna in each antenna area based on the distance between each antenna area and the human body.

In the terminal, the processing module 702 is specifically configured to:

determine, based on the distance between each antenna area and the human body and a correspondence between the distance and the transmission power that correspond to each antenna area, target transmission power corresponding to the distance between each antenna area and the human body, and adjust the transmission power of the antenna in each antenna area to the target transmission power.

In the terminal, the processing module 702 is further configured to:

determine, based on a first distance and a correspondence between a distance and transmission power, target transmission power corresponding to the first distance, and adjust the transmission power of the antenna in the N antenna areas to the target transmission power, where the first distance is a distance between a first antenna area and the human body, the first antenna area belongs to the N antenna areas, and the distance between the first antenna area and the human body is the smallest.

In the terminal, the determining module 701 is specifically configured to:

transmit an electromagnetic wave based on a first preset period by using the radio frequency fingerprint identification circuit, and measure the distance between the human body and the terminal based on the reflected electromagnetic wave of the human body received by the radio frequency fingerprint identification circuit.

The determining module 701 is further configured to:

after determining that the distance between the human body and the terminal is greater than or equal to a preset distance, transmit the electromagnetic wave based on a second preset period by using the radio frequency fingerprint identification circuit, where the second preset period is greater than the first preset period.

Based on a same technical idea, the present disclosure further provides another terminal. The terminal can perform the foregoing method embodiments. The terminal includes:

at least one processor 801; and a radio frequency antenna unit 802 and a radio frequency fingerprint identification circuit 803 that are in communication connection with the at least one processor 801; and a memory 804 in communication connection with the at least one processor 801, where the radio frequency antenna unit 802 includes at least one antenna; and the memory 804 stores an instruction that can be executed by the at least one processor 801, and the instruction is executed by the at least one processor 801, to enable the at least one processor 801 in combination with the radio frequency antenna unit 802 and the radio frequency fingerprint identification circuit 803 to:

after determining that a human body is close to the terminal, measure a distance between the human body and the terminal by using the radio frequency fingerprint identification circuit 803; and control transmission power of an antenna in the radio frequency antenna unit 802 based on the distance between the human body and the terminal.

The terminal further includes an infrared detection unit 805 in communication with the at least one processor 801; and the processor 801 is configured to:

after detecting, by using the radio frequency fingerprint identification circuit 803, that the human body is close to the terminal, start the infrared detection unit 805 to detect a temperature of the human body, and after the temperature of the human body satisfies a preset condition, determine that the human body is close to the terminal.

In the terminal, the processor 801 is configured to:

receive, by using the radio frequency fingerprint identification circuit 803, a reflected electromagnetic wave transmitted by a target object, and if determining that a feature of the reflected electromagnetic wave conforms to an inherent electromagnetic wave feature of a reflected electromagnetic wave of the human body, determine that the human body is close to the terminal, where the inherent electromagnetic wave feature of the reflected electromagnetic wave of the human body includes a dielectric constant of greater than 26 and less than 80 and a relative refractive index of greater than 4 and less than 8.

In the terminal, the terminal includes N antenna areas, at least one antenna is disposed in each of the N antenna areas, and N is a positive integer.

the processor 801 is specifically configured to:

measure a distance between each of the N antenna areas and the human body by using the radio frequency fingerprint identification circuit 803; and control, for each of the N antenna areas, transmission power of an antenna in each antenna area based on the distance between each antenna area and the human body.

In the terminal, the processor 801 is specifically configured to:

determine, based on the distance between each antenna area and the human body and a correspondence between the distance and the transmission power that correspond to each antenna area, target transmission power corresponding to the distance between each antenna area and the human body, and adjust the transmission power of the antenna in each antenna area to the target transmission power.

In the terminal, the processor 801 is specifically further configured to:

determine, based on a first distance and a correspondence between a distance and transmission power, target transmission power corresponding to the first distance, and adjust the transmission power of the antenna in the N antenna areas to the target transmission power, where the first distance is a distance between a first antenna area and the human body, the first antenna area belongs to the N antenna areas, and the distance between the first antenna area and the human body is the smallest.

In the terminal, the processor 801 is further configured to:

transmit an electromagnetic wave based on a first preset period by using the radio frequency fingerprint identification circuit 803, and measure the distance between the human body and the terminal based on the reflected electromagnetic wave of the human body received by the radio frequency fingerprint identification circuit; and after determining that the distance between the human body and the terminal is greater than or equal to a preset distance threshold, transmit the electromagnetic wave based on a second preset period by using the radio frequency fingerprint identification circuit 803, where the second preset period is greater than the first preset period.

It can be learned from the foregoing content that:

In this embodiment of the present disclosure, the transmission power of the antenna in the radio frequency antenna unit is controlled based on the distance between the human body and the terminal, so that a parasitic capacitance generated when the human body is close to the intelligent terminal does not need to be measured, in other words, no separate SAR reduction sensor module circuit needs to be added, greatly reducing complexity of a hardware design of a radio frequency module. In addition, in the existing technology, the order of magnitude of the change in the parasitic capacitance generated when the human body is close to the intelligent terminal is small, and there are a large number of interference sources. Consequently, incorrect measurement easily occurs, causing transmission power control to be not sufficiently accurate and proper. However, in this embodiment of the present disclosure, the transmission power is controlled based on the distance between the human body and the terminal. The order of magnitude of the change in the distance between the human body and the terminal is far greater than the order of magnitude of the change in the parasitic capacitance, and there are relatively few interference sources. Therefore, the measured distance has relatively high precision and accuracy, thereby achieving transmission power control with relatively high precision and accuracy.

A person skilled in the art should understand that, an embodiment of the present disclosure may be provided as a method, a system, or a computer program product. Therefore, the present disclosure may be used in a form of an embodiment with complete hardware, an embodiment with complete software, or an embodiment combining software and hardware aspects. In addition, the present disclosure may be used in a form of a computer program product that is implemented on one or more computer usable storage channels (including but not limited to a magnetic disk memory, an optical memory, and the like) including computer usable program code.

The present disclosure is described with reference to the flowcharts and/or the block diagrams of the method, the device (system), and the computer program product according to the present disclosure. It should be understood that, each procedure and/or block in the flowcharts and/or the block diagrams, and a combination of procedures and/or blocks in the flowcharts and/or the block diagrams may be implemented by using computer program instructions. These computer program instructions may be provided to a general purpose computer, a dedicated computer, an embedded processor, or a processor of another programmable data processing device, to generate a machine instruction, so that an apparatus configured to implement a function specified in one or more procedures in a flowchart and/or one or more blocks in a block diagram is generated by using an instruction executed by a computer or the processor of the another programmable data processing device.

These computer program instructions may alternatively be stored in a computer readable memory that can lead the computer or the another programmable data processing device to work in a particular manner, so that the instructions stored in the computer readable memory generate a manufactured product including an instruction apparatus. The instruction apparatus implements a function specified in one or more procedures in a flowchart and/or one or more blocks in a block diagram.

These computer program instructions may alternatively be loaded into the computer or the another programmable data processing device, so that a series of operation steps are performed on the computer or the another programmable device to generate processing generated by the computer. In this way, the instructions executed on the computer or the another programmable device provide a step used for implementing a function specified in one or more procedures in a flowchart and/or one or more blocks in a block diagram.

Apparently, the person skilled in the art may make various modifications and variations to the present disclosure without departing from the spirit and scope of the present disclosure. In this way, if these modifications and variations to the present disclosure fall within the scope of the claims of the present disclosure and equivalent technologies thereof, the present disclosure is also intended to include these modifications and variations.

In conclusion, the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present disclosure.

What is claimed is:

1. A method for controlling transmission power, applicable to a terminal, wherein the terminal comprises a display screen, a radio frequency antenna unit and a radio frequency fingerprint identification circuit, the radio frequency antenna unit comprises at least one antenna; wherein the radio frequency fingerprint identification circuit is a two-dimensional array integrated circuit disposed below the display screen, and a size of the radio frequency fingerprint identification circuit is the same as a size of the display screen; and the method comprises:

after determining that a human body is close to the terminal, measuring a distance between the human body and the terminal by using the radio frequency fingerprint identification circuit;

wherein the radio frequency fingerprint identification circuit transmits based on a second preset period being greater than a first preset period when the distance between the human body and the terminal is greater than or equal to a preset distance threshold, and controlling transmission power of an antenna in the radio frequency antenna unit based on the distance between the human body and the terminal.

2. The method according to claim 1, wherein the terminal further comprises an infrared detection unit; and the determining that a human body is close to the terminal comprises:

after detecting, by using the radio frequency fingerprint identification circuit, that the human body is close to the terminal, starting the infrared detection unit to detect a temperature of the human body, and after the temperature of the human body satisfies a preset condition, determining that the human body is close to the terminal.

3. The method according to claim 2, wherein the detecting, by using the radio frequency fingerprint identification circuit, that the human body is close to the terminal comprises:

receiving, by using the radio frequency fingerprint identification circuit, a reflected electromagnetic wave transmitted by a target object, and if determining that a feature of the reflected electromagnetic wave conforms to an inherent electromagnetic wave feature of a reflected electromagnetic wave of the human body, determining that the human body is close to the terminal, wherein the inherent electromagnetic wave feature of the reflected electromagnetic wave of the human body comprises a dielectric constant of greater than 26 and less than 80, and a relative refractive index of greater than 4 and less than 8.

4. The method according to claim 1, wherein the terminal comprises N antenna areas, at least one antenna is disposed in each of the N antenna areas, and N is a positive integer;

the measuring a distance between the human body and the terminal by using the radio frequency fingerprint identification circuit comprises:

measuring a distance between each of the N antenna areas and the human body by using the radio frequency fingerprint identification circuit; and the controlling transmission power of the antenna based on the distance between the human body and the terminal comprises:

controlling, for each of the N antenna areas, transmission power of an antenna in each antenna area based on the distance between each antenna area and the human body.

5. The method according to claim 4, wherein the controlling transmission power of an antenna in each antenna area based on the distance between each antenna area and the human body comprises:

determining, based on the distance between each antenna area and the human body and a correspondence between the distance and the transmission power that correspond to each antenna area, a target transmission power corresponding to the distance between each antenna area and the human body, and adjusting the transmission power of the antenna in each antenna area to the target transmission power.

6. The method according to claim 4, wherein the controlling transmission power of the antenna based on the distance between the terminal and the human body further comprises:
determining, based on a first distance and a correspondence between a distance and transmission power, target transmission power corresponding to the first distance, and adjusting the transmission power of the antenna in the N antenna areas to the target transmission power, wherein the first distance is a distance between a first antenna area and the human body, the first antenna area belongs to the N antenna areas, and the distance between the first antenna area and the human body is the smallest.

7. The method according to claim 1, wherein the measuring a distance between the human body and the terminal by using the radio frequency fingerprint identification circuit comprises:
transmitting an electromagnetic wave based on a first preset period by using the radio frequency fingerprint identification circuit, and measuring the distance between the human body and the terminal based on the reflected electromagnetic wave of the human body received by the radio frequency fingerprint identification circuit; and
the method further comprises:
after determining that the distance between the human body and the terminal is greater than or equal to a preset distance threshold, transmitting the electromagnetic wave based on a second preset period by using the radio frequency fingerprint identification circuit, wherein the second preset period is greater than the first preset period.

8. A terminal, wherein the terminal comprises a display screen, a radio frequency antenna unit and a radio frequency fingerprint identification circuit, the radio frequency antenna unit comprises at least one antenna, wherein the radio frequency fingerprint identification circuit is a two-dimensional array integrated circuit disposed below the display screen, and a size of the radio frequency fingerprint identification circuit is the same as a size of the display screen; and the terminal further comprises: a determining module, configured to: after determining that a human body is close to the terminal, measure a distance between the human body and the terminal by using the radio frequency fingerprint identification circuit;
wherein the radio frequency fingerprint identification circuit transmits based on a second preset period being greater than a first preset period when the distance between the human body and the terminal is greater than or equal to a preset distance threshold;
and a processing module, configured to control transmission power of an antenna in the radio frequency antenna unit based on the distance between the human body and the terminal.

9. The terminal according to claim 8, wherein the terminal further comprises an infrared detection unit; and
the determining module is further configured to:
after detecting, by using the radio frequency fingerprint identification circuit, that the human body is close to the terminal, start the infrared detection unit to detect a temperature of the human body, and after the temperature of the human body satisfies a preset condition, determine that the human body is close to the terminal.

10. The terminal according to claim 9, wherein the determining module is specifically configured to:
receive, by using the radio frequency fingerprint identification circuit, a reflected electromagnetic wave transmitted by a target object, and if determining that a feature of the reflected electromagnetic wave conforms to an inherent electromagnetic wave feature of a reflected electromagnetic wave of the human body, determine that the human body is close to the terminal, wherein the inherent electromagnetic wave feature of the reflected electromagnetic wave of the human body comprises a dielectric constant of greater than 26 and less than 80, and a relative refractive index of greater than 4 and less than 8.

11. The terminal according to claim 8, wherein the terminal comprises N antenna areas, at least one antenna is disposed in each of the N antenna areas, and N is a positive integer;
the determining module is specifically configured to:
measure a distance between each of the N antenna areas and the human body by using the radio frequency fingerprint identification circuit; and
the processing module is specifically configured to:
control, for each of the N antenna areas, transmission power of an antenna in each antenna area based on the distance between each antenna area and the human body.

12. The terminal according to claim 11, wherein the processing module is further configured to: determine, based on a first distance and a correspondence between a distance and transmission power, target transmission power corresponding to the first distance, and adjust the transmission power of the antenna in the N antenna areas to the target transmission power, wherein the first distance is a distance between a first antenna area and the human body, the first antenna area belongs to the N antenna areas, and the distance between the first antenna area and the human body is the smallest.

13. The terminal according to claim 8, wherein the processing module is specifically configured to: determine, based on the distance between each antenna area and the human body and a correspondence between the distance and the transmission power that correspond to each antenna area, a target transmission power corresponding to the distance between each antenna area and the human body, and adjust the transmission power of the antenna in each antenna area to the target transmission power.

14. A terminal, comprising: at least one processor, a display screen; and a radio frequency antenna unit and a radio frequency fingerprint identification circuit that are in communication connection with the at least one processor; and a memory in communication connection with the at least one processor, wherein the radio frequency antenna unit comprises at least one antenna; the radio frequency fingerprint identification circuit is a two-dimensional array integrated circuit disposed below the display screen, and a size of the radio frequency fingerprint identification circuit is the same as a size of the display screen; and the memory stores an instruction that can be executed by the at least one processor, and the instruction is executed by the at least one processor, to enable the at least one processor in combination with the radio frequency antenna unit and the radio frequency fingerprint identification circuit to: after determining that a human body is close to the terminal, measure a distance between the human body and the terminal by using the radio frequency fingerprint identification circuit; wherein the radio frequency fingerprint identification circuit transmits based on a second preset period being greater than a first preset period when the distance between the human body and the terminal is greater than or equal to a preset distance threshold;

and control transmission power of an antenna in the radio frequency antenna unit based on the distance between the human body and the terminal.

15. The terminal according to claim 14, wherein the terminal further comprises an infrared detection unit in communication with the at least one processor; and the processor is configured to:

after detecting, by using the radio frequency fingerprint identification circuit, that the human body is close to the terminal, start the infrared detection unit to detect a temperature of the human body, and after the temperature of the human body satisfies a preset condition, determine that the human body is close to the terminal.

16. The terminal according to claim 15, wherein the processor is configured to:

receive, by using the radio frequency fingerprint identification circuit, a reflected electromagnetic wave transmitted by a target object, and if determining that a feature of the reflected electromagnetic wave conforms to an inherent electromagnetic wave feature of a reflected electromagnetic wave of the human body, determine that the human body is close to the terminal, wherein the inherent electromagnetic wave feature of the reflected electromagnetic wave of the human body comprises a dielectric constant of greater than 26 and less than 80 and a relative refractive index of greater than 4 and less than 8.

17. The terminal according to claim 14, wherein the terminal comprises N antenna areas, at least one antenna is disposed in each of the N antenna areas, and N is a positive integer; and the processor is specifically configured to:

measure a distance between each of the N antenna areas and the human body by using the radio frequency fingerprint identification circuit; and control, for each of the N antenna areas, transmission power of an antenna in each antenna area based on the distance between each antenna area and the human body.

18. The terminal according to claim 17, wherein the processor is specifically configured to:

determine, based on the distance between each antenna area and the human body and a correspondence between the distance and the transmission power that correspond to each antenna area, a target transmission power corresponding to the distance between each antenna area and the human body, and adjust the transmission power of the antenna in each antenna area to the target transmission power.

19. The terminal according to claim 17, wherein the processor is specifically further configured to:

determine, based on a first distance and a correspondence between a distance and transmission power, a target transmission power corresponding to the first distance, and adjust the transmission power of the antenna in the N antenna areas to the target transmission power, wherein the first distance is a distance between a first antenna area and the human body, the first antenna area belongs to the N antenna areas, and the distance between the first antenna area and the human body is the smallest.

20. The terminal according to claim 14, wherein the processor is further configured to:

transmit an electromagnetic wave based on a first preset period by using the radio frequency fingerprint identification circuit, and measure the distance between the human body and the terminal based on the reflected electromagnetic wave of the human body received by the radio frequency fingerprint identification circuit; and after determining that the distance between the human body and the terminal is greater than or equal to a preset distance threshold, transmit the electromagnetic wave based on a second preset period by using the radio frequency fingerprint identification circuit, wherein the second preset period is greater than the first preset period.

* * * * *